United States Patent Office 3,392,000
Patented July 9, 1968

3,392,000
PROCESS FOR PRODUCING HYDROGEN FROM A CARBONACEOUS MATERIAL
Salvatore A. Guerrieri, Rowayton, Conn., assignor to The Lummus Company, New York, N.Y., a corporation of Delaware
Filed Sept. 3, 1965, Ser. No. 484,942
17 Claims. (Cl. 23—211)

ABSTRACT OF THE DISCLOSURE

A process for producing hydrogen wherein a carbonaceous material, in finely divided form, is reacted with water at a temperature between 640° and 690° F. and at a pressure to maintain the water in a liquid state. The carbonaceous material may be either a solid, such as, coal, or coke, or a liquid, such as a residual oil.

---

This invention relates in general to the production of hydrogen and, more particularly, it relates to the production of hydrogen from coke, coal or hydrocarbon oils. The process of the invention features the catalytic reaction of water in the liquid state with the carbon or hydrocarbon of the raw material at elevated temperatures and pressures.

It is known that water in the liquid state will react with carbon to produce hydrogen, carbon monoxide and carbon dioxide according to the following endothermic reactions:

$$C + H_2O \rightarrow H_2 + CO \quad (1)$$

$$C + 2H_2O \rightarrow 2H_2 + CO_2 \quad (2)$$

In the same manner, water will react with hydrocarbons according to the following reactions, also endothermic:

$$C_nH_m + nH_2O \rightarrow \left(n + \frac{m}{2}\right)H_2 + nCO \quad (3)$$

$$C_nH_m + 2nH_2O \rightarrow \left(2n + \frac{m}{2}\right)H_2 + nCO_2 \quad (4)$$

These reactions are generally carried out in the presence of a suitable catalyst. High temperatures favor Reactions 1 and 3, and Reactions 2 and 4 are favored at lower temperatures. For example, at temperatures within the range of about 640° F. to 690° F., and at pressures sufficiently high to maintain water in the liquid state (about 5000 p.s.i.g.), Reactions 2 and 4 predominate and substantially no carbon monoxide is formed.

Heretofore, hydrocarbon feedstocks have been the material of choice for a variety of processes producing hydrogen-rich synthesis gases by catalytic reforming, with steam as the vehicle of choice to supply the necessary water in vapor form. In any such hydrocarbon process, it is highly desirable to select the operating conditions so that the reaction

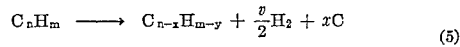
$$C_nH_m \rightarrow C_{n-x}H_{m-y} + \frac{v}{2}H_2 + xC \quad (5)$$

which results in the deposit of free carbon, is avoided in favor of Reactions 1 and 2 above, involving the oxidation of carbon. In other words, the speed of Reactions 1 to 4 should be greater than that of Reaction 5.

To accomplish these ends and bring about the proper reactions at the appropriate high temperatures, large quantities of steam are employed, all or a portion of which may be separately preheated to reaction temperature. Such measures increase both the capital and operating costs of such processes, particularly since the heat values contained in the excess steam are difficult to recover economically. They also require the use of high-priced alloys and refractories.

It is thus a general object of the present invention to provide an improved process for the recovery of hydrogen by reaction of water with an inexpensive carbonaceous material.

A further object of the present invention is to provide an improved process for the production of hydrogen from coal, coke, petroleum coke or hydrocarbons, such as residual oils, wherein large quantities of steam are not required.

Yet another object of the present invention is to provide an improved process for producing hydrogen from carbonaceous materials wherein all reactions are carried out in liquid media, rather than in the gaseous state.

Still another object of the present invention is to provide an improved process for producing hydrogen wherein the hydrogen compressors necessary to supply the gas at high pressure, as are required for ammonia synthesis, are eliminated.

Various other objects and advantages of the invention will become clear from the following description of several embodiments thereof, and the novel features will be particularly pointed out in connection with the appended claims.

The reaction of carbon, as a component of either a liquid or solid compound, with water in the liquid state has not heretofore found favor because, while high temperatures favor Reactions 2 and 4 over 1 and 3, reaction rate increases with increasing temperature. Reaction rate also depends on surface exposed, however, and it has now been discovered that these seeming handicaps can be overcome if the reactants can be suitably finely divided and intimately mixed. This not only produces a satisfactory yield of hydrogen with practically no CO generation, but carries out the reaction at modest temperatures without any need for high pressure, high temperature steam.

In one embodiment of the invention, coal, coke or char of essentially any type can be employed. If in lump form, it is first crushed, then passed into a conventional grinding circuit where it is comminuted preferably, to 100 percent minus 300 mesh. The finer state of division of the solid, the more reactive surface is exposed and, since reaction rate is a function of surface area, the higher the reaction rate will be. Also, required reactor volume becomes smaller.

The powdered solid is passed to a mixing tank where water and recycle coke are added. The liquid to solid weight ratio in the mixture is maintained at about 3 or higher, to provide a free flowing slurry and, of course, at least the stoichiometric proportion of water. The mixture is then pumped at high pressure through two preheating stages, where it passes in indirect heat exchange with both the underflow and overhead from the reactor, and is then passed into the fired heater associated with the reactor, together with recycle slurry, from where it passes into the reactor.

Conditions within the reactor are dictated by the critical temperature and pressure of water, approximately 705° F. and 3206 p.s.i.a. It is desirable to operate at close to but under the critical temperature, and a pressure as much above the critical pressure as is economically practical. Exact conditions for a particular installation may be established with a suitable economic balance. Generally, the temperature will be in the range of 640° to 690° F. and the pressure will be in the area of 5000 p.s.i.g., though the latter figure may be varied broadly while still keeping water in the liquid state. It should be noted, of course, that the partial pressure effect of the evolved hydrogen will carry off some water or hydrocarbon in vapor form, but the water is substantially maintained as a liquid.

The reactor is of any suitable design for promoting liquid-liquid or liquid-solid contact between the phases and for disengagement of gaseous reaction products. It is important to insure good dispersion and high relative velocities between the phases. In liquid-liquid systems, the catalyst, in the form of a finely divided solid, is maintained as a circulating load. In liquid-solid systems a fixed catalyst is preferred. Suitable catalysts for this type of process are oxidation-reduction compounds of the general formula $M_aN_b$ wherein M is a metal selected from Groups 3, 4, 5 or 8 of the Periodic Table, N is an anion, including oxygen, and $a$ and $b$ are integers ranging from 2 to 7. Relative velocity between the phases is also important as it effects phase boundary resistance and thus effects reaction rate by its effect on mass transfer. Reactor temperature is conveniently maintained by circulating a portion of the underflow through a suitable heater and recycling it back into the reactor. Recirculation of the slurry through the heater tubes at high velocity improves both contact and shear between the phases.

Effluent gaseous reaction products and vaporized reactants are removed as an overhead from the reactor, passed in heat exchange with fresh reactants, condensibles are removed and recycled to the reactor, and the hydrogen-rich gas is passed to conventional cleaning operations. An advantage of the process is the elimination of the hydrogen compressor normally necessary, due to the high reactor pressure herein employed.

Net underflow from the reactor, containing water, unreacted coke and ash, is also passed in heat exchange with the reactants. By "net underflow" is meant that portion of the slurry in the reactor not recirculated through a heater to maintain reactor temperature.

The net underflow is passed to a two-stage separation, wherein coke is removed and recycled, ash is passed to waste, and the water is recycled, make-up water being added as required.

In the embodiment of the invention where a liquid hydrocarbon is the raw material, the same essential processing steps are employed, but account is taken of the fact that the two liquids are immiscible in each other. Processing is somewhat simpler, however, since there is no problem of separating ash. A net underflow is thus eliminated. The reactor should be provided with suitable agitating means. In this regard, the pipe coil in the heater helps insure contact between reactants due to the turbulence caused by high velocities therein. Where a tower reactor is used, it may be preferable to remove slurry from more than one level for circulation through the heater, as some separation between oil and water is possible even with severe agitation. In either event, catalyst is again supplied as a circulating load of finely divided solids.

A third embodiment of the invention, particularly applicable to liquid sources of carbon, involves forcing the reactants and reaction products down through a fixed-bed catalytic reactor, and removing the reaction products in a separation zone after leaving the reactor.

Understanding of the invention will be facilitated by referring to the following detailed description of three embodiments thereof, taken in conjunction with the accompanying drawings, in which.

Figure 1:
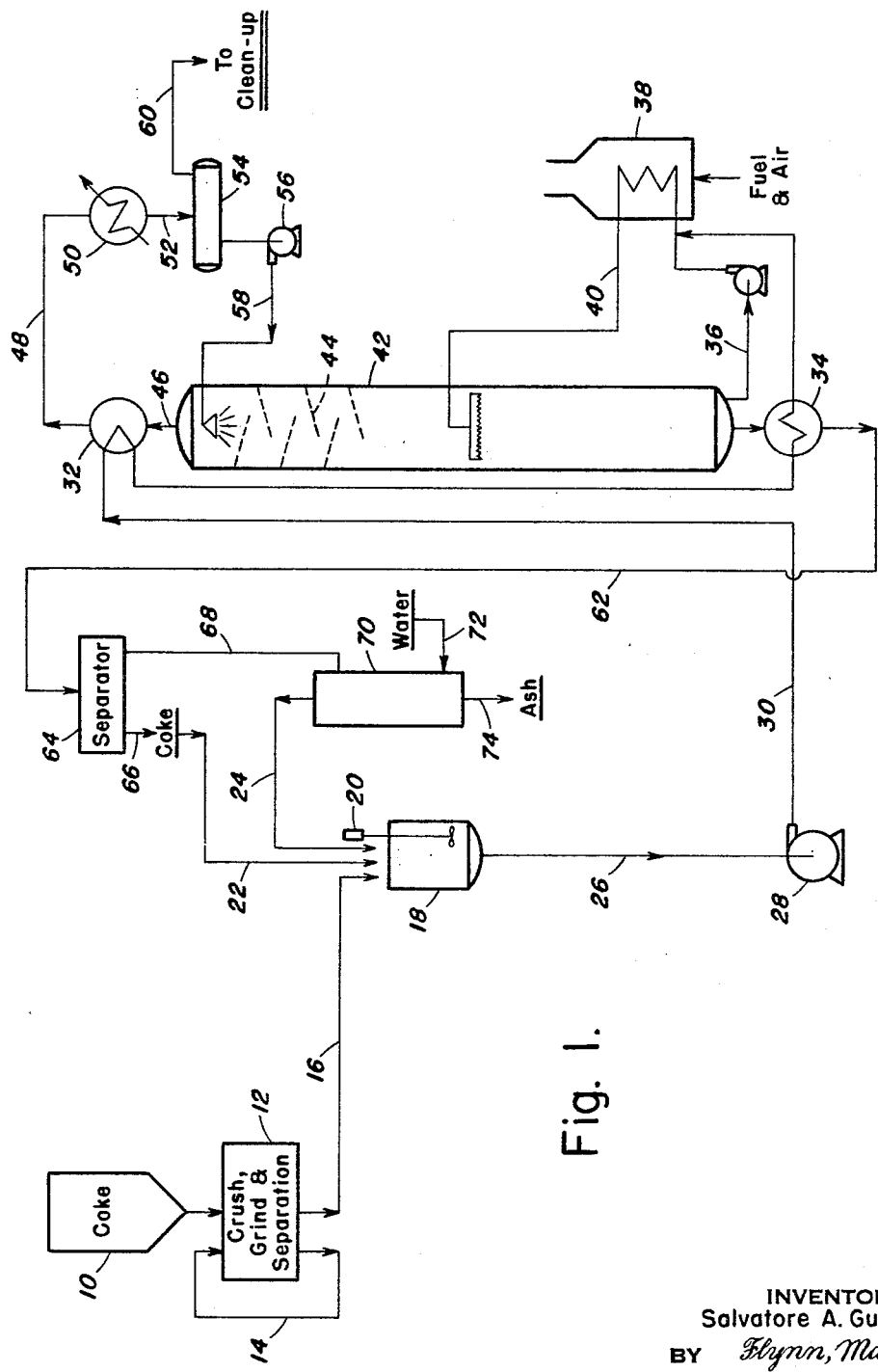
FIGURE 1 is a simplified, schematic flow sheet of a first embodiment of the invention, employing coke as a raw material.

With reference to FIGURE 1, coke from storage 10 is first passed through a conventional crushing and grinding circuit, followed by size separation, as for example by air elutriation, all of this being indicated generally at 12, oversize particles being passed back via line 14. Fine particles, preferably minus 300 mesh, are transferred in line 16 to mixing tank 18, which is provided with suitable agitating means 20.

In tank 18, recycle coke and water are added from line 22 and make-up and recycle water are added from line 24, the liquid to solid ratio being at least 3.

The thoroughly mixed slurry passes in line 26 to pump 28 where it attains a sufficient pressure for injection into the reactor. The slurry, now under high pressure, is passed in line 30 through heat exchangers 32 and 34 and is then injected into line 36, which contains the slurry being circulated to heater 38. After passage through heater 40, the combined slurry passes in line 40 to reactor 42.

As indicated in the drawing, reactor 42 is provided with a plurality of trays 44 over which the condensate mixture flows.

Evolved gases are passed via line 46 to heat exchanger 32 to preheat reactants, and then they pass in line 48 to condenser 50. The liquid-gas mixture passes via line 52 into drum 54 where condensibles are separated and pumped back into reactor 42, pump 56 and line 58 being employed for this purpose. The gaseous components are passed to clean-up operations (not shown) in line 60.

A portion of the slurry from reactor 42 passes into line 36 and is pumped through heater 38 and recycled in line 40 in order to maintain reactor 42 at the reaction temperature. Net underflow is passed directly to heat exchanger 34, where it preheats the reactants. The liquid is still under high pressure, and if economically warranted, power may be recovered through a turbine driving one of the pumps in the system.

The withdrawn slurry, after passage through exchanger 34, is passed in line 62 to a suitable separator 64, wherein unreacted coke is separated and recycled via line 66.

The water still contains considerable ash and coke and for this reason it is passed in line 68 to separator 70. Make-up water is added as required from line 72, and ask is removed via line 74. The water is passed to tank 18 via line 24.

In the embodiment of the invention illustrated in FIGURE 2, several features are the same in design and function as described in connection with FIGURE 1, and these have been indicated with prime numerals.

Figure 2:
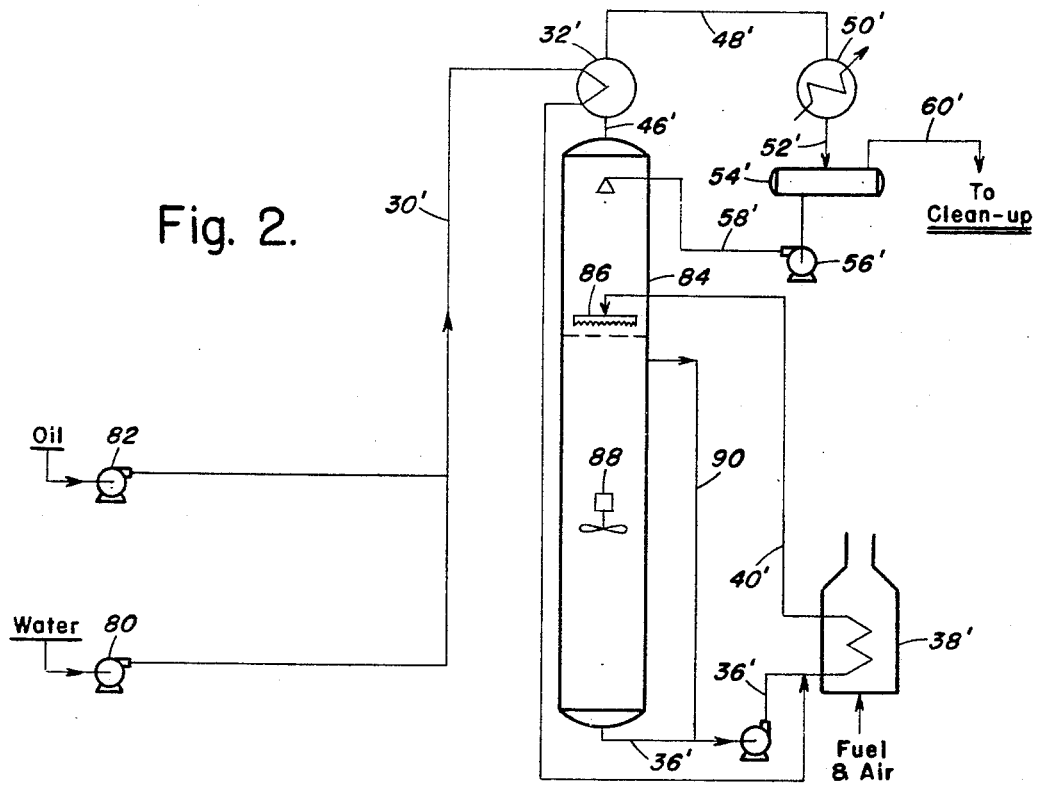
FIGURE 2 is a simplified, schematic flow sheet of a second embodiment of the invention, wherein a liquid hydrocarbon is employed as raw material.

With reference to FIGURE 2, water in a predetermined quantity is pumped by pump 80, at high pressure, into line 30' and oil is pumped by pump 82 into the same line. After passing through heat exchanger 32' the liquid is passed into line 36', heater 38' and into reactor 84 via line 40'.

Reactor 84 is operated at the same temperatures and pressures as described hereinabove, and agitation of the reactants, which enter the reactor via line 40' and distributor 86, is effected by mechanical agitators 88 (one shown) or other suitable means.

Treatment of the evolved gases (overhead) is identical with that described in connection with FIGURE 1. Due to the tendency of oil and water to separate within the reactor, it is advisable to draw off underflow from more than just the bottom (line 36'), so line 90 is provided. This underflow is reheated and recycled, as in FIGURE 1.

Since no ash is produced drawing off of a net underflow is not necessary.

Figure 3:
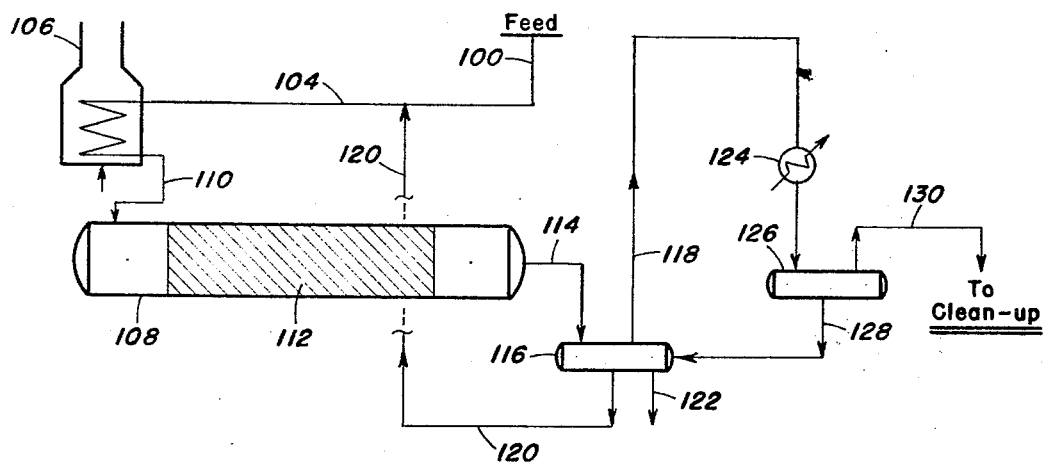
FIGURE 3 is a simplified schematic flow sheet of a third embodiment of the invention including a fixed-bed catalytic reactor.

In FIGURE 3 there is illustrated yet another embodiment of the invention, preferably for use with a liquid-liquid feed mixture and employing a fixed-bed catalytic reactor.

As shown in this drawing, the pressurized feed, an oil-water mixture in line 100 is mixed with recycle liquid from line 120 in line 104. The combined liquids pass through fired heater 106 and into reactor 108 via line 110.

Reactor 108 has a fixed catalyst bed 112, of any suitable design, and the reactants are passed therethrough at a sufficiently high velocity so that both reactants and gaseous reaction products pass out into line 114. The mixture passes to a drum 116 where a gaseous overhead 118 and a liquid underflow 120 are drawn off. A portion of the underflow from drum 116 is periodically diverted into line 122 to remove accumulated residues; otherwise the liquid passes directly to lines 104, 120 and back to heater 106.

The reaction products and condensibles in line 118 are treated in a manner similar to the previous embodiments. A condenser 124 and drum 126 separate the condensibles, which are passed back to drum 116 in line 128, and the hydrogen-rich product gas is sent to clean-up in line 130.

Understanding of the invention will be further facilitated by the following specific examples of the embodiment of FIGURE 1, wherein material flow (in pounds per hour unless otherwise indicated) and reaction temperatures and pressures are set forth in tabular form. The tabulated data are for a plant with design capacity of 5.5M S.C.F.D. of hydrogen.

EXAMPLE I

| Line | Flow, lb./hr. | Temp., °F. | Pressure, p.s.i.a. |
|---|---|---|---|
| 16 (coke) | 4,800 | | |
| 22: | | | |
| (Coke) | 960 | 140 | |
| (Water) | 6,720 | 140 | |
| 24 | 24,040 | 100 | |
| 30 | 31,890 | | 5,000+ |
| 46 | | 640 | 5,000 |
| 58 | 11,550 | 350 | |
| 60: | | | |
| (H₂) | ¹640 | 350 | |
| (CO₂) | ¹320 | | |
| (H₂O) | ¹30 | | |
| 40 | | 680 | |
| 62: | | | |
| Ash | 480 | | |
| Coke | 1,440 | | |
| Water | 13,440 | | |
| 66: | | | |
| Coke | 960 | | |
| Water | 6,720 | | |
| 68: | | | |
| Ash | 480 | | |
| Coke | 480 | | |
| Water | 6,720 | | |

¹ Mols/hr.

Various changes in the details, steps, materials and arrangements of parts, which have herein been described and illustrated in order to explain the nature of the invention, may be made by those skilled in the art within the principle and scope of the invention as expressed in the appended claims.

What is claimed is:

1. A process for producing hydrogen from water and a carbonaceous material comprising:
   intimately mixing said carbonaceous material, in finely divided form with water in a ratio of at least three parts water to one part carbon;
   heating the mixture so obtained in a reaction zone to a temperature within the range of about 640° to 690° F. at a pressure sufficient to maintain said water in the liquid state; and
   withdrawing a hydrogen-rich gas as a product.

2. A process as claimed in claim 1, and additionally comprising causing rapid relative motion between said water and said carbonaceous material by strong agitation during reaction therebetween.

3. A process as claimed in claim 1, wherein said heating is carried out by withdrawing a portion of said mixture from said reaction zone, heating said portion in suitable heating means and returning said portion to said reaction zone.

4. A process as claimed in claim 1, and additionally comprising preheating said carbonaceous material and said water by indirect heat exchange with products withdrawn from said reaction zone.

5. A process as claimed in claim 1, and additionally comprising providing a suitable catalyst within said reaction zone.

6. A process as claimed in claim 5, wherein said catalyst is in the form of finely divided solid particles of an oxidation-reduction compound of the general formula $M_aN_b$, wherein M is a metal selected from the group consisting of Groups 3, 4, 5 and 8 metals of the Periodic Table, N is an anion, and $a$ and $b$ are integers of from 2 to 7.

7. A process as claimed in claim 5, wherein said catalyst is in the form of a fixed bed within said reaction zone, said mixture being passed downwardly therethrough, and additionally comprising withdrawing said mixture and said hydrogen-rich gas from said zone prior to separating said gas as product.

8. A process for producing hydrogen from water and solid carbonaceous material comprising:
   crushing and grinding said carbonaceous material to substantially 100% minus 300 mesh;
   mixing said carbonaceous material with water in proportions of at least three parts water to one part coke to form a slurry;
   preheating said slurry;
   passing said slurry to a reaction zone maintained at a temperature within the range of about 640° to 690° F. and a pressure sufficient to maintain said water substantially in the liquid state;
   providing rapid relative motion between said water and said carbonaceous material by strong agitation while in said reaction zone;
   withdrawing a hydrogen-rich gas from said reaction zone as a product; and
   withdrawing ash and unreacted water and carbon from said reaction zone.

9. A process as claimed in claim 8, wherein said unreacted water and carbon and said gas are utilized as indirect heat exchange media in said preheating step.

10. A process as claimed in claim 8, wherein said reaction zone is maintained at said temperature by withdrawing a portion of said slurry, passing said portion through suitable heating means, and returning said portion to said reaction zone.

11. A process as claimed in claim 8, and additionally comprising separating ash from said unreacted water and carbon, and recycling said unreacted water and carbon to said mixing step.

12. A process as claimed in claim 8, wherein the pressure in said reaction zone is about 5000 p.s.i.g.

13. A process for producing hydrogen from water and a liquid hydrocarbon comprising:
   preheating said water and said hydrocarbon;
   passing said water and said hydrocarbon, in a ratio of at least three parts water to each part hydrocarbon, into a reaction zone, said reaction zone being maintained at a temperature within the range of about 640° to 690° F. and a pressure sufficient to maintain said water substantially in the liquid state;
   providing rapid relative motion between said water and said liquid hydrocarbon dispersion by strong agitation; and
   withdrawing a hydrogen-rich gas from said reaction zone as product;

14. A process as claimed in claim 13, wherein said liquid hydrocarbon is a residual oil.

15. A process as claimed in claim 13, and additionally comprising providing a suitable catalyst within said reaction zone.

16. A process as claimed in claim 13, wherein said gas is utilized as an indirect heat exchange medium in said preheating step.

17. A process as claimed in claim 13, wherein said unreacted water and liquid hydrocarbon are withdrawn from a plurality of points in said reaction zone, and further comprising maintaining the temperature of said reaction zone by separately heating a portion of the water and unreacted hydrocarbon so withdrawn, and recycling said heated portion to said reaction zone.

References Cited
UNITED STATES PATENTS

| | | | |
|---|---|---|---|
| 1,926,587 | 9/1933 | Hansgirg | 23—212 |
| 2,164,403 | 6/1939 | Guthrie et al. | 23—212 XR |

FOREIGN PATENTS 7,128   5/1927   Australia.

OSCAR R. VERTIZ, *Primary Examiner.*

EDWARD STERN, *Examiner.*